United States Patent
Hu

(10) Patent No.: US 7,462,950 B2
(45) Date of Patent: Dec. 9, 2008

(54) MAGNETIC LEVITATION WEIGHT REDUCTION STRUCTURE FOR A VERTICAL WIND TURBINE GENERATOR

(76) Inventor: Suey-Yueh Hu, No. 38, Lane 69, Ho Guang St., Nan Zi District, Kaohsiung City (TW)

( * ) Notice: Subject to any disclaimer, the term of this patent is extended or adjusted under 35 U.S.C. 154(b) by 0 days.

(21) Appl. No.: 11/625,262

(22) Filed: Jan. 19, 2007

(65) Prior Publication Data
US 2008/0174119 A1 Jul. 24, 2008

(51) Int. Cl.
*F03D 9/00* (2006.01)
*H02P 9/04* (2006.01)

(52) U.S. Cl. .......................... 290/55; 290/44

(58) Field of Classification Search ............. 290/1 R, 290/43, 44, 54, 55; 60/398; 416/132 B; 415/4.2
See application file for complete search history.

(56) References Cited

U.S. PATENT DOCUMENTS

| | | | | |
|---|---|---|---|---|
| 4,320,927 A * | 3/1982 | Sertich | | 310/90.5 |
| 4,340,260 A * | 7/1982 | Forster et al. | | 310/90.5 |
| 4,379,598 A * | 4/1983 | Goldowsky | | 310/90.5 |
| 6,160,336 A * | 12/2000 | Baker et al. | | 310/74 |
| 6,510,799 B2 | 1/2003 | Lamb et al. | | |
| 6,831,374 B2 * | 12/2004 | Seki | | 290/44 |
| 6,899,036 B2 | 5/2005 | Lamb et al. | | |
| 7,204,192 B2 | 4/2007 | Lamb et al. | | |
| 7,211,905 B1 * | 5/2007 | McDavid, Jr. | | 290/44 |
| 2004/0195838 A1 * | 10/2004 | Tomas | | 290/1 R |
| 2007/0040385 A1 * | 2/2007 | Uchiyama | | 290/44 |
| 2007/0241566 A1 * | 10/2007 | Kuehnle | | 290/53 |

FOREIGN PATENT DOCUMENTS

JP 03277107 A * 12/1991

OTHER PUBLICATIONS

Letter and specific embodiment developed from the claims of Mr. Lamb's patents completed and documented by Magna Force, Inc in Apr. 2004.

* cited by examiner

*Primary Examiner*—J. Gonzalez
(74) *Attorney, Agent, or Firm*—WPAT, P.C.; Anthony King

(57) ABSTRACT

A magnetic levitation weight reduction structure for a vertical wind turbine generator includes a frame, a fixed permanent magnet, an axle, a revolving permanent magnet, a blade hub, and a generator. The fixed permanent magnet fixed to the frame has a first repulsive surface. The axle is connected to the frame. The revolving permanent magnet fixed to the axle has a second repulsive surface in relation to the first repulsive surface of the fixed permanent magnet. Both the first and the second repulsive surfaces repel with each other. The blade hub and the generator are connected to the axle. When the revolving permanent magnet is rotated, the axle functions as a balance center.

3 Claims, 7 Drawing Sheets

MAGNETIC LEVITATION WEIGHT REDUCTION STRUCTURE FOR A VERTICAL WIND TURBINE GENERATOR

BACKGROUND OF THE INVENTION (a) Field of the Invention

The present invention relates to a magnetic levitation weight reduction structure adapted to a vertical wind turbine generator, and more particularly, to one that is capable of producing repulsive force from the same magnetic pole of a fixed permanent magnet and a revolving permanent magnet thus to drive a hub to revolve with reduced support weight while upgrading the turning efficiency of the hub and increasing its revolving speed.

(b) Description of the Prior Art

A conventional wind turbine generator comprises a base, a turbine hub, a linking shaft, and a generator. The base includes a locating portion. The turbine hub is disposed with multiple blades and a fixed shaft at the center. The fixed shaft corresponds to the locating portion of the base to revolve. The fixed shaft is provided with a gear set. The linking shaft corresponds to the gear set and turns around when the gear set is engaged with the linking shaft to transmit wind velocity to the generator. However, as the size and weight ratio of the hub varies, the revolving efficiency and speed of the fixed shaft supporting the hub are compromised due to the weight ratio, resulting in noise due to friction.

SUMMARY OF THE INVENTION

The primary purpose of the present invention is to provide a magnetic levitation weight reduction structure for a vertical wind turbine generator by having repulsive force created due to same magnetic pole thus to alleviate support weight sustained by the axle and minimize operating noise of the turbine.

To achieve the purpose, the present invention comprises a frame; a fixed permanent magnet secured to the frame having a first repulsive surface; an axle assembled by rotation to the frame comprising a first connecting portion and a second connecting portion; a revolving permanent magnet secured to the axle having a second repulsive surface in relation to the first repulsive surface of the fixed permanent magnet; a blade hub connected to the first connecting portion of the axle; a generator connected to the second connecting portion of the axle. The axle functions as a balance center when the revolving permanent magnet is rotated.

A repulsive force created by the same magnetic pole of the fixed permanent magnet and the revolving permanent alleviates the burden while the axle drives the blade hub to revolve, offsets the resistance by friction of the generator connected to the axle, promotes the revolving efficiency and speed of the axle, and reduces the noise created by friction against the generator.

DETAILED DESCRIPTION OF THE PREFERRED EMBODIMENTS

Figure 1:
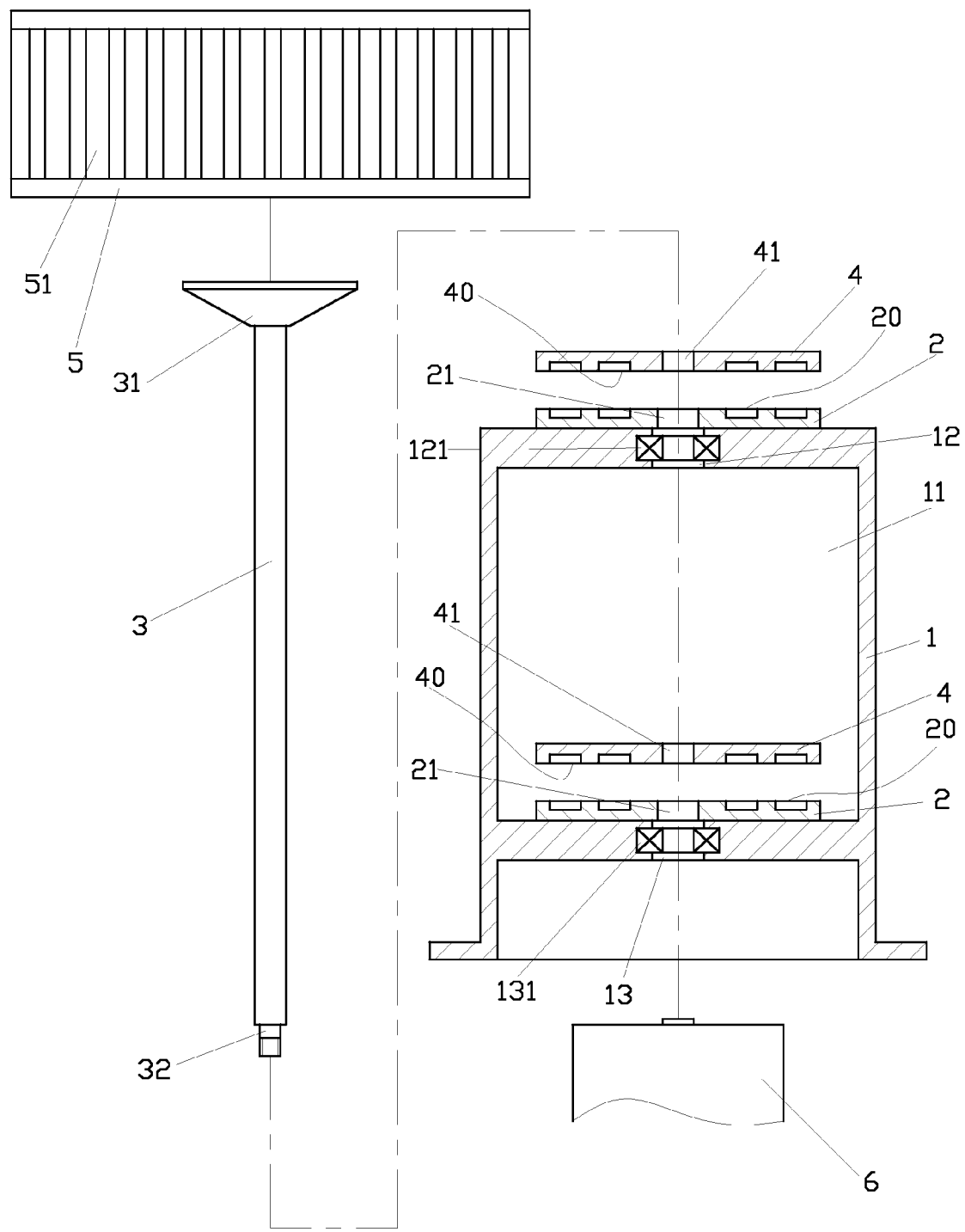
FIG. 1 is an exploded view of a first embodiment of the present invention.

Referring to FIG. 1, the present invention includes a frame (1), a fixed permanent magnet (2), an axle (3), a revolving permanent magnet (4) a blade hub (5), and a generator (6).

The frame (1) contains a chamber (11), a first through hole (12) disposed at the top of the frame (1), and a second through hole (13) disposed at the bottom of the frame (1). A first bearing (121) is provided in the first hole (12) of the frame (1), and a second bearing (131) is provided in the second through hole (13) of the frame (1).

The fixed permanent magnet (2) fixed to the frame (1) has a first repulsive surface (20), and is disposed with a through hole (21) in relation to the first through hole (12) of the frame (1).

The axle (3) pivotally connected to the first bearing (121) and the second bearing (131) of the frame (1) comprises a first connecting portion (31) and a second connecting portion (32).

The revolving permanent magnet (4) has a second repulsive surface (40) and a through hole (41). The revolving permanent magnet (4) is secured to the axle (3) through the through hole (41) and corresponds in position to the fixed permanent magnet (2). The second repulsive surface (4) is repulsive in relation to the first repulsive surface (20). When the revolving permanent magnet (4) is rotated, the axle (3) functions as a balance center.

The blade hub (5) connected to the first connecting portion (31) of the axle (3) comprises a plurality of spaced blades (51).

The generator (6) is connected to the second connecting portion (32) of the axle (3).

Figure 2:
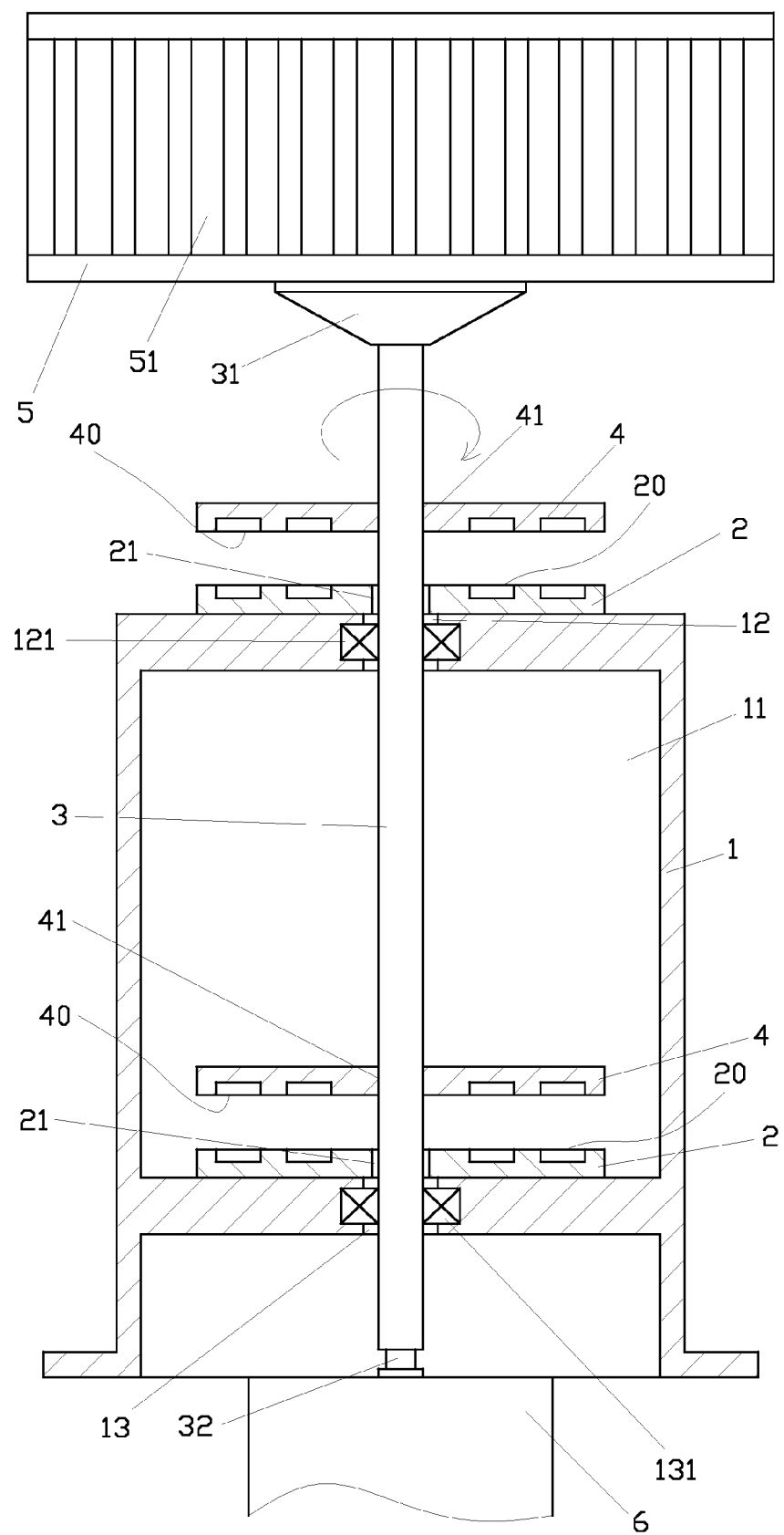
FIG. 2 is a sectional view of the first embodiment of the present invention as assembled.

To assemble the present invention, as illustrated in FIG. 2, the axle (3) penetrates into the first through hole (12), the second through hole (13) of the frame (1), and the through hole (21). The axle (3) is secured in the first bearing (121) and the second bearing (131) to freely rotate and to secure the revolving permanent magnet (4). The first repulsive surface (20) of the fixed permanent magnet (2) corresponds in position to the second repulsive surface (40) of the revolving permanent magnet (4), and both have the same magnetic pole to repel with each other, so that a floating force is formed between the fixed permanent magnet (2) and the revolving permanent magnet (4). The blade hub (5) is fixed to the first connecting portion (31) of the axle (3), and the second connecting portion (32) of the axle (3) is connected to the generator (6).

Figure 3:
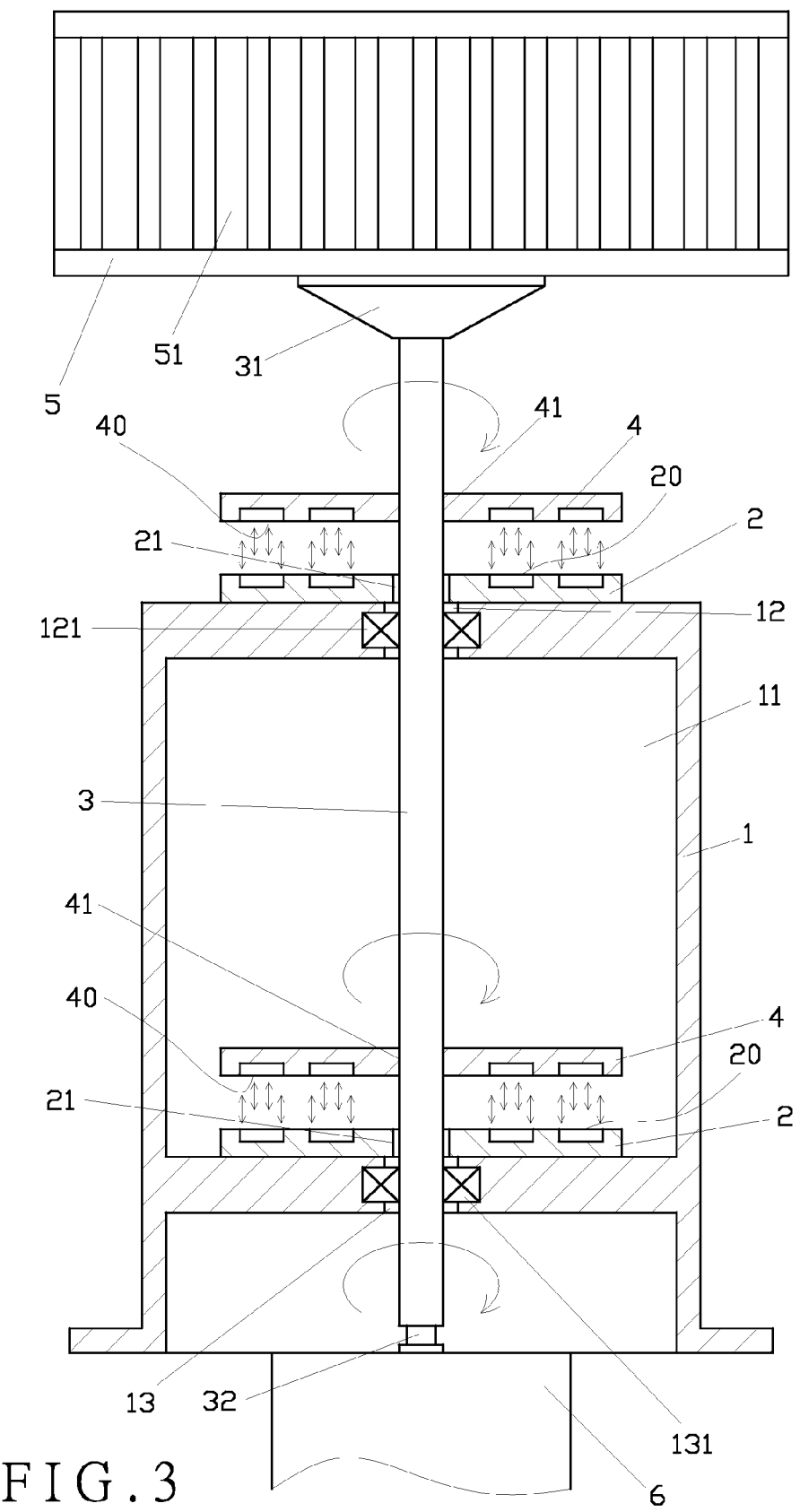
FIG. 3 is a schematic view of the first embodiment of the present invention in an operating status.

In operation as illustrated in FIG. 3, the repulsive force created by the same magnetic pole of both the fixed permanent magnet (2) and the revolving permanent (4) alleviates the burden while the axle (3) drives the blade hub (5) to revolve, offsets the resistance by friction of the generator (6) connected to the axle (3), promotes the revolving efficiency and speed of the axle (3), and reduces the noise created by friction against the generator (6).

Figure 4:
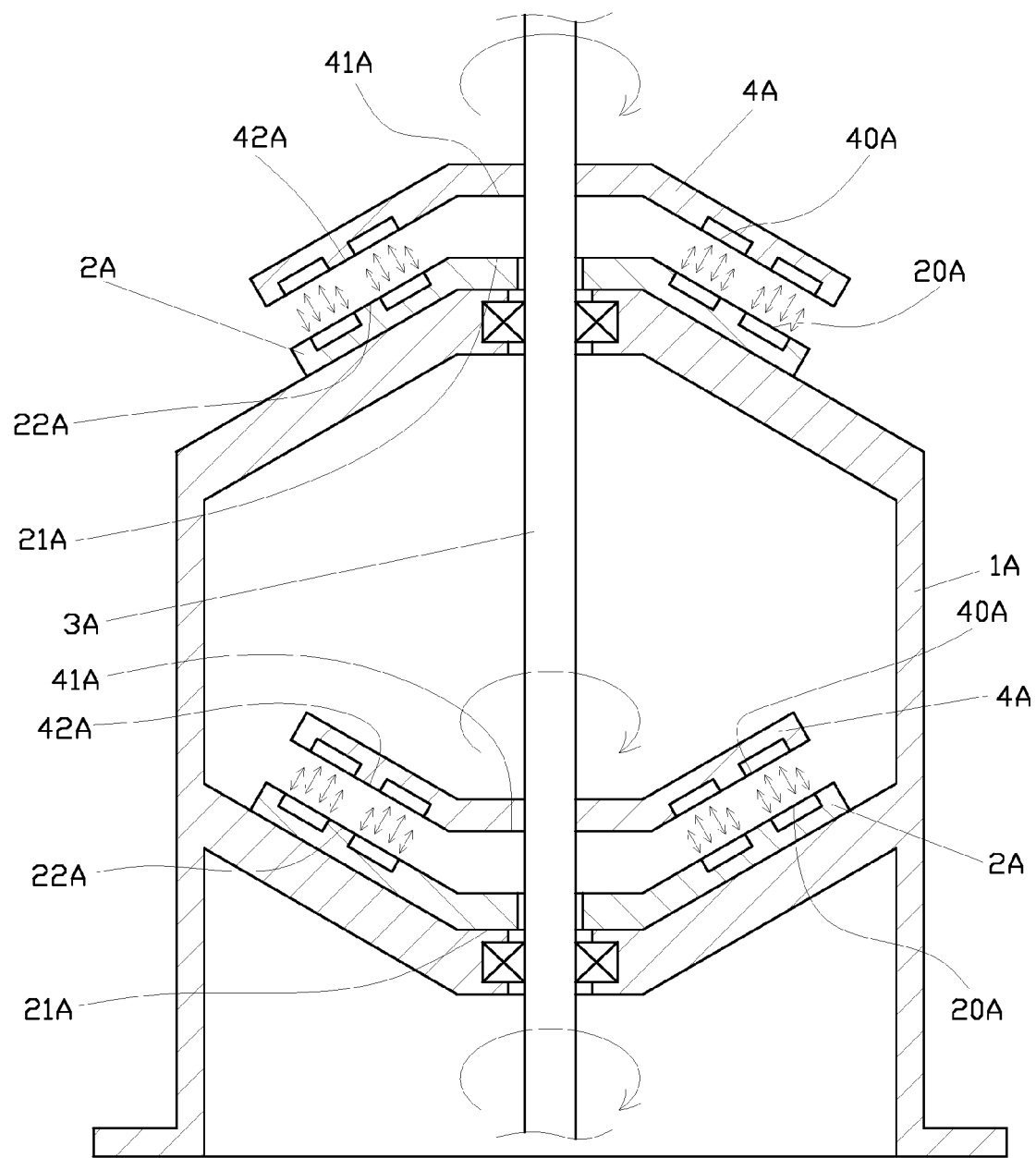
FIG. 4 is a schematic view of a second embodiment of the present invention.

In a second embodiment of the present invention as illustrated in FIG. 4, a fixed permanent magnet (2A) is fixed to a frame (1A). The fixed permanent magnet (2A) has a first repulsive surface (20A), a circular flat portion (21A) and an inclined portion (22A) extending from the circumference of the flat portion (21A). An axle (3A) is inserted through the frame (1A) and the fixed permanent magnet (2A). A revolving permanent magnet (4A) fixed to the axle (3A) has a second repulsive surface (40A), a flat portion (41A) and an inclined portion (42A) extending from the circumference of the flat portion (41A). Both the first repulsive surface (20A) of the fixed permanent magnet (2A) and the second repulsive surface (40A) of the revolving permanent magnet (4A) are assembled in the shape of a bowl. A repulsive force is created by the same magnetic pole of the fixed permanent magnet (2A) and the revolving permanent magnet (4A). When the blades are revolving for being subject to wind velocity, a repulsive force is relatively created by and between both the inclined portions (22A, 42A) to help the axle (3A) remain its vertical position while turning without bias to exaggerate the resistance.

Figure 5:
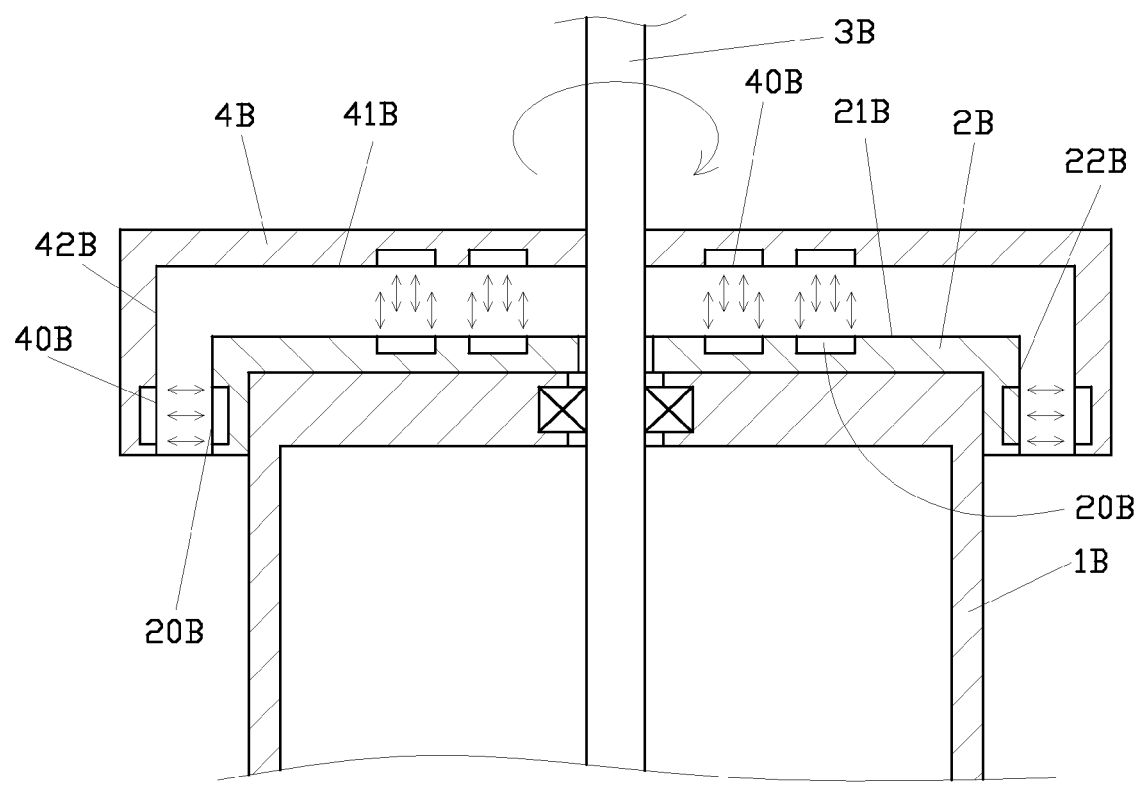
FIG. 5 is a schematic view of a third embodiment of the present invention.

FIG. 5 shows a third embodiment of the present invention. A fixed permanent magnet (2B) is fixed to a frame (1B). The fixed permanent magnet (2B) has a first repulsive surface (20B), a flat portion (21B) and a flange (22B) vertically extending from the circumference of the flat portion (21B). An axle (3B) penetrates through the frame (1B) and the fixed permanent magnet (2B). A revolving permanent magnet (4B) fixed to the axle (3B) has a second repulsive surface (40B), a flat portion (41B) and a flange (42B) vertically extending from the circumference of the flat portion (41B). Accordingly, the configuration between the fixed permanent magnet (2B) and the revolving permanent magnet (4B) indicates a reverse U-like shape; and a repulsive force is relatively produced by the same magnetic pole of the permanent magnet (2B) and the revolving permanent magnet (4B). Once the blades revolve for being subject to wind velocity, a repulsive force is relatively created between the vertical flange (22B) and the vertical flange (42B) to maintain the axle (3B) its vertical position while revolving without bias to exaggerate the resistance.

Figure 6:
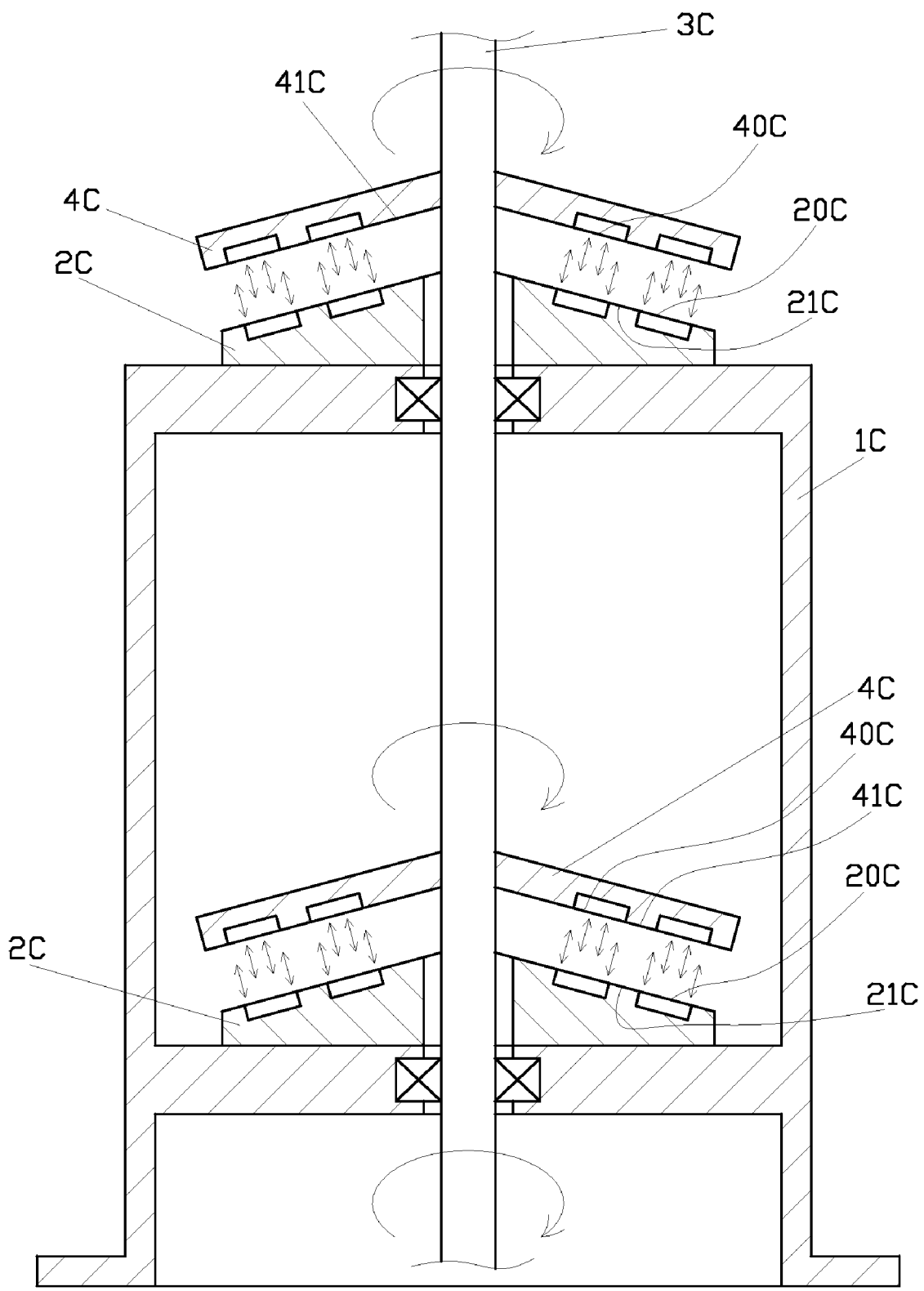
FIG. 6 is a schematic view of a fourth embodiment of the present invention.
Figure 7:
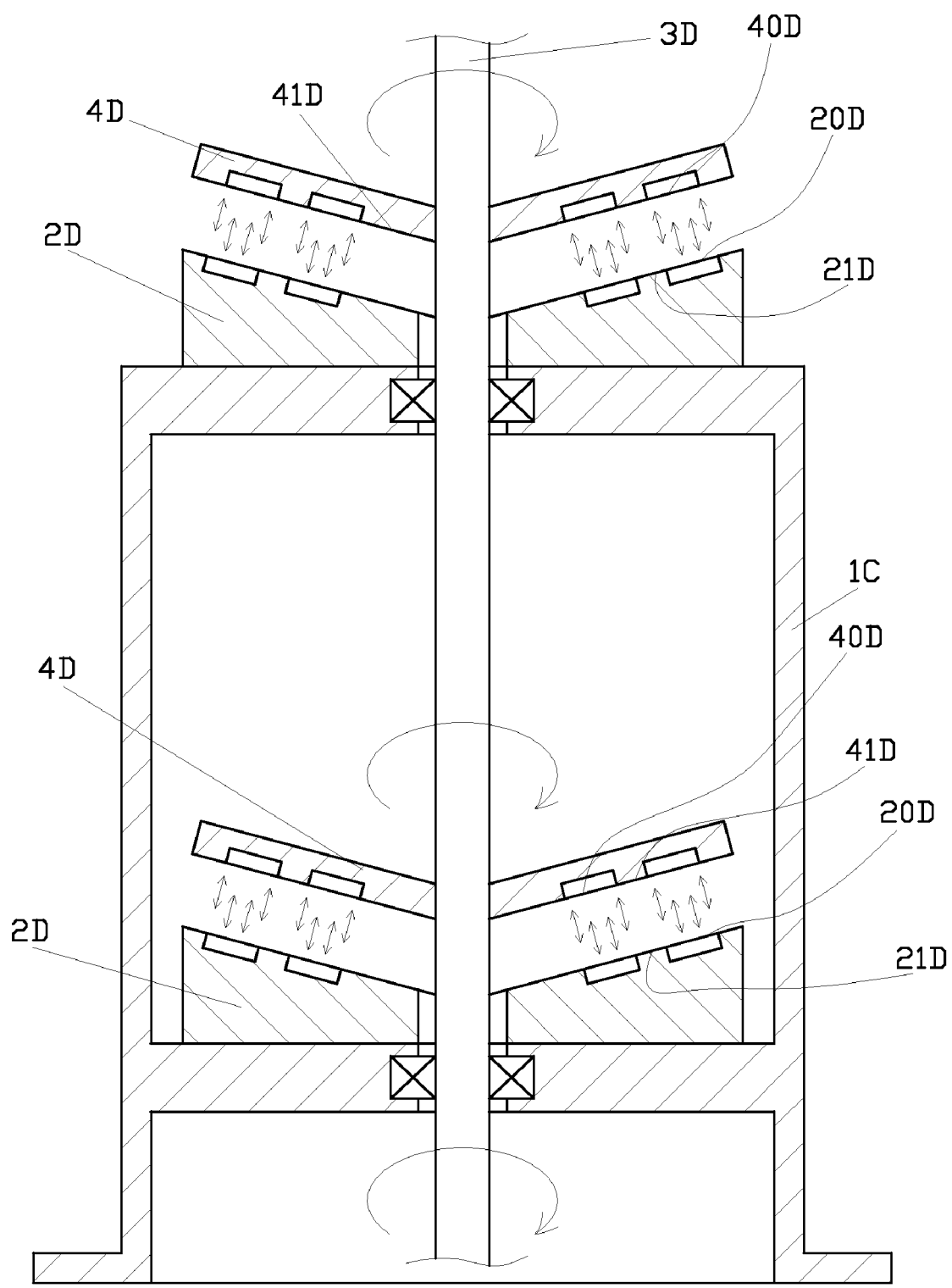
FIG. 7 is a schematic view of a fifth embodiment of the present invention.

FIGS. 6 and 7 show a fourth embodiment and a fifth embodiment of the present invention. A fixed permanent magnet (2C, 2D) is fixed to a frame (1C). The fixed permanent magnet (2C, 2D) has a first repulsive surface (20C, 20D) and an inclined portion (21C, 21D). An axle (3C) penetrates through the frame (1C) and the fixed permanent magnet (2C, 2D). A revolving permanent magnet (4C) fixed to the axle (3C) has a second repulsive surface (40C, 40D) and an inclined portion (41C, 41D). The fixed permanent magnet (2C) and the revolving permanent magnet (4C) indicate an inverse V-shaped configuration as illustrated in FIG. 6. The fixed permanent magnet (2D) and the revolving permanent magnet (4D) indicate a V-shaped configuration as illustrated in FIG. 7. A repulsive force is relatively created by the same magnetic pole of the first repulsive surface (20C, 20D) of the fixed permanent member (2C, 2D) and the second repulsive surface (40C, 40D) of the revolving permanent magnet (4C, 4D). Accordingly when the blades revolve for being subject to wind velocity, a repulsive force is relatively created by and between the inclined portion (21C, 21D) and the inclined portion (41C, 41D) to maintain the axle (3B) its vertical position while revolving without bias to exaggerate the resistance.

What is claimed is:

1. A magnetic levitation weight reduction structure for a vertical wind turbine generator, comprising:
   a frame;
   a fixed permanent magnet fixed to the frame having a first repulsive surface;
   an axle connected to the frame comprising a first connecting portion and a second connecting portion;
   a revolving permanent magnet secured to the axle having a second repulsive surface in relation to the first repulsive surface of the fixed permanent magnet, the first repulsive surface and the second repulsive surface repelling with each other, the axle functioning as a balance center when the revolving permanent magnet is rotated;
   a blade hub connected to the first connecting portion of the axle;
   a generator connected to the second connecting portion of the axle;
   wherein the fixed permanent magnet and the revolving permanent magnet each has at least one inclined portion, wherein the first repulsive surface and the second repulsive surface correspond to each other, to create a repulsive force so that the axle remains in a vertical position while turning without bias to exaggerate a resistance; and
   wherein the fixed permanent magnet and the revolving permanent magnet have a disk shape.

2. A magnetic levitation weight reduction structure for a vertical wind turbine generator as claimed in claim 1, wherein each of the fixed permanent magnet and the revolving permanent magnet has a flat portion and an inclined portion abutting the flat portion.

3. A magnetic levitation weight reduction structure for a vertical wind turbine generator as claimed in claim 1, wherein each of the fixed permanent magnet and the revolving permanent magnet has a flat portion and a vertical portion abutting the flat portion.

* * * * *